United States Patent [19]

Malik

[11] 3,803,499

[45] Apr. 9, 1974

[54] ULTRA BROAD BAND RF PHASE SHIFTER

[75] Inventor: Chester Malik, Lynn Field, Mass.

[73] Assignee: The United States of America as represented by the Secretary of the Air Force, Washington, D.C.

[22] Filed: Apr. 11, 1973

[21] Appl. No.: 350,258

[52] U.S. Cl. .................. 328/155, 328/166, 325/163, 332/9 R

[51] Int. Cl. .................. H03c 3/00

[58] Field of Search ........... 328/155, 166; 178/66 R; 325/163; 332/9 R

[56] References Cited

UNITED STATES PATENTS

| | | | |
|---|---|---|---|
| 3,368,637 | 2/1968 | Green et al. | 328/166 X |
| 3,436,691 | 4/1969 | Hoffman et al. | 328/155 X |
| 3,464,016 | 8/1969 | Kerwin et al. | 328/166 X |
| 3,760,274 | 9/1973 | Vogt | 328/155 X |

*Primary Examiner*—John S. Heyman

[57] ABSTRACT

An ultra broad band RF phase shifter includes a variable generator providing sine and cosine signals. A preselected RF signal is split into two equal phase and equal amplitude signals. One of the split signals is modulated by the sine signal and the other by the cosine signal to provide two modulated in-phase RF signals whose amplitude relation is orthogonal (i.e., linear polarization). The two modulated signals are circularly polarized which imposes an orthogonal phase relationship thereupon. By variation of the sine, cosine generator a phase rotation results.

8 Claims, 2 Drawing Figures

ULTRA BROAD BAND RF PHASE SHIFTER

BACKGROUND OF THE INVENTION

The prior art RF phase shifters have limitations. For example, one limitation resides in the inability to achieve a very wide bandwidth. Another limitation exists in the lack of linearity over a very wide bandwidth. Still another limitation is the inability to provide rapid phase rotation. The present invention eliminates the aforementioned limitations and provides an ultra broad band RF phase shifter capable of providing rapid, linear phase rotation over a wide bandwidth without amplitude change.

The phase shifter of this invention has a particular utility in the testing of a variety of equipment utilized in ionosphere studies including synchronous satellite transmissions. For example, it may be used to calibrate and test polarimeters which require a rotating phase. It is noted that phase shifter provides linear and circular polarization.

SUMMARY OF THE INVENTION

An ultra broad band RF phase shifter is provided. A variable generator produces sine and cosine signals. A preselected RF voltage is divided into two equal phase, equal amplitude signals. The sine signal modulates one of the divided signals and the cosine signal, the other. At this point, duplicating linear polarization, the two signals are equal in phase but are orthoganally related in amplitude. To obtain circular polarization, the two modulated signals are fed through a broad band quadrature 90° hybrid junction thereby improving a 90° phase shift between them. At the output, there is provided circularly polarized RF signals whose phase is rotated in accordance with the variation of the sine, cosine generator.

DETAILED DESCRIPTION OF THE PREFERRED EMBODIMENT

Figure 1:
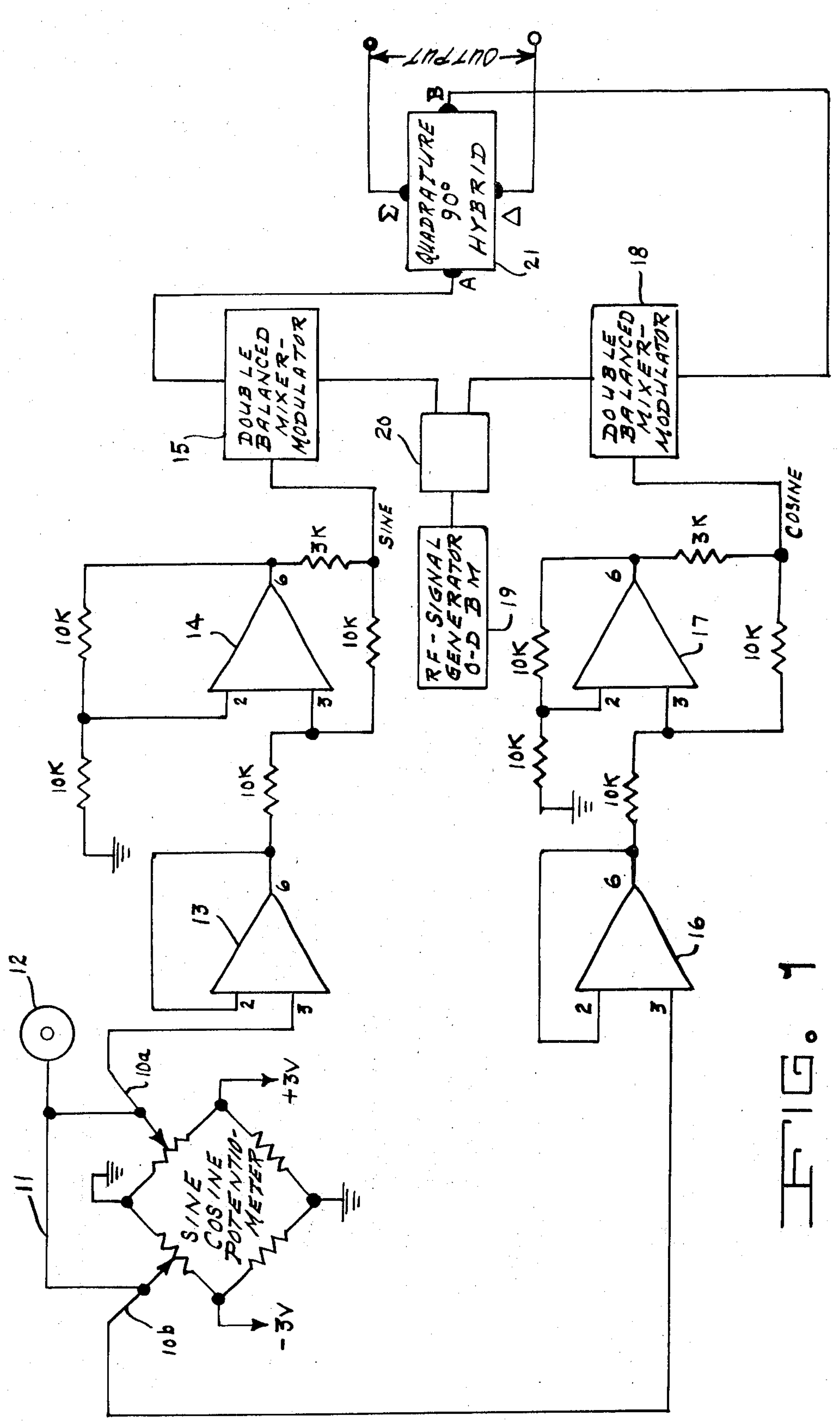
FIG. 1 shows partly in schematic and partly in block form the ultra broad band RF phase shifter of the present invention.

Referring in detail to FIG. 1, there is shown conventional sine-cosine potentiometer 10. Movable arms 10*a* and 10*b* are connected to motor shaft 11. Motor shaft 11 is associated with 0.5 rpm motor 12. If desired, shaft 11 may be disconnected from its associated motor and rotated independently. A sine signal is provided by way of potentiometer arm 10*a* which is passed successively through voltage followers 13 and 14 to double balanced mixer-modulator 15. A cosine signal is provided by way of movable arm 10*b* which is passed successively through voltage followers 16 and 17 to double balanced mixer-modulator 18. Voltage followers 13, 14, 16 and 17 are conventional and are shown with their associated resistance to obtain the desired impedance. They are utilized to drive their respective double balanced mixer-modulators. Double balanced mixer-modulators are also conventional and may be of the Hewlett-Packard type No. 1045A.

The RF signal to be phase rotated in this instance is provided by conventional ODBM RF signal generator 19. It is noted that in place of RF signal generator 19, any other desired RF input signal source may be utilized. RF signal generator 19 is variable and may be adjusted to any desired frequency. The RF signal is fed simultaneously by way of conventional isolator T 20 to double balanced mixer-modulators 15 and 18. Isolator T 20 splits the RF signal into two equal phase and equal amplitude signals.

The input sine signal to double balanced mixer-modulator 15 modulates the RF signal therein and the input cosine signal to double balanced mixer-modulator 18 modulates the RF signal therein so that the outputs therefrom are equal in phase but are orthogonally related in amplitude thus duplicating linear polarization. These outputs at points A and B may be used for testing certain types of polarimeters.

To obtain circular polarization, the two modulated signals are fed through broad band quadrature 90° hybrid junction 21 imposing a 90° phase shift between them. Quadrature 90° hybrid junction 21 is conventional and may be of the JH series type manufactured by Adams-Russel Co. The quadrature 90° hybrid may consist of two 180° four part sum and difference hybrids separated by two reciprocal phase shift networks. Although the phase shift varies with frequency, the difference between them is always 90°. The result at the output is a circularly polarized RF signal whose phase can be manipulated by rotation of sine-cosine potentiometer 10 from 0° to 360°. In place of the potentiometer the sine-cosine signals may be generated by a variable conventional quadrature oscillator.

The bandwidth of the RF phase shifter is determined by the bandwidth of the RF components used, i.e., the double balanced mixer-modulators and the quadrature 90° hybrid. At the present, state of the art commercial components are available giving 1 MHz to 1,000 MHz bandwidth.

Figure 2:
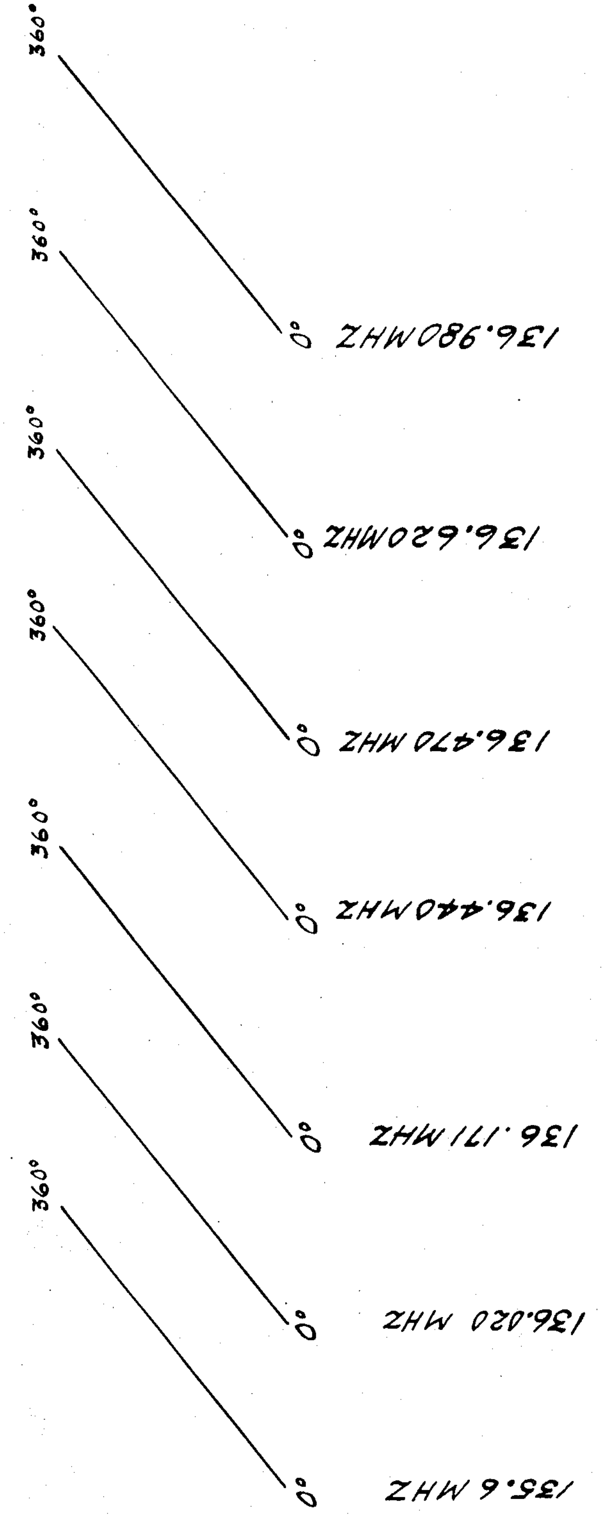
FIG. 2 shows a series of phase plots of the linearity of the RF phase shifter at indicated frequencies over a phase rotation of 0° to 360°.

Now referring to FIG. 2, there is shown a series of linear curves, each curve representing a plot of a preselected frequency against phase rotation from 0° to 360°. It is emphasized that it is possible to obtain a bandwidth from 1 MHz to 1,000 MHz while maintaining linearity as indicated in the curve of the aforementioned FIG. 2.

It is noted that the RF phase shifter may be used to calibrate polarimeters requiring linear or circular polarization signals that are rotatable.

I claim:

1. An ultra broad band RF phase shifter comprising a variable sine and cosine generator providing sine and cosine signals, a source of RF signal of a preselected frequency, means to divide said RF signal into first and second equal phase and equal amplitude signals, first means to modulate said first equal phase and equal amplitude signal by said sine signal to provide a first output signal, second means to modulate said second equal phase and equal amplitude signal by said cosine signal to provide a second output signal, said first and second output signals being equal in phase and orthogonally related in amplitude, and means to circularly polarize said first and second output signals to provide third and fourth output signal with a 90° phase shift therebetween with the phase thereof rotatable from 0° to 360° by variation of said sine-cosine generator.

2. A RF phase shifter as described in claim 1 wherein said variable sine-cosine generator is comprised of a variable sine-cosine potentiometer.

3. A RF phase shifter as described in claim 1 wherein said variable sine-cosine generator is comprised of a variable quadrature oscillator.

4. A RF phase shifter as described in claim 1 wherein said sine signal is fed to said first modulating means by way of successive first and second voltage followers, and said cosine signal is fed to said second modulating means by way of successive third and fourth voltage followers.

5. A RF phase shifter as described in claim 1 wherein said first and second modulating means is comprised of first and second double balanced mixer-modulators, respectively.

6. A RF phase shifter as described in claim 1 wherein said means to divide is comprised of an isolator T network.

7. A RF phase shifter as described in claim 1 wherein said means to circularly polarize is comprised of a quadrature 90° hybrid.

8. A RF phase shifter as described in claim 1 wherein said RF signal source is comprised of a variable RF signal generator.

* * * * *